(12) United States Patent
Okamoto (10) Patent No.: US 7,380,571 B2
(45) Date of Patent: Jun. 3, 2008

(54) DIRECTIONAL CONTROL VALVE

(75) Inventor: Kazuya Okamoto, Tokyo (JP)

(73) Assignee: Koganei Corporation, Tokyo (JP)

( * ) Notice: Subject to any disclaimer, the term of this patent is extended or adjusted under 35 U.S.C. 154(b) by 394 days.

(21) Appl. No.: 11/144,140

(22) Filed: Jun. 3, 2005

(65) Prior Publication Data

US 2005/0224119 A1 Oct. 13, 2005

(51) Int. Cl.
*F15B 13/04* (2006.01)

(52) U.S. Cl. .......................... 137/625.69; 137/625.63; 137/625.64; 137/625.66; 251/361; 251/900

(58) Field of Classification Search .......... 137/625.63, 137/625.64, 625.66, 625.69; 251/361, 362, 251/363, 364, 900
See application file for complete search history.

(56) References Cited

U.S. PATENT DOCUMENTS

| | | | | | |
|---|---|---|---|---|---|
| 2,906,492 | A | | 9/1959 | Conrad | 251/325 |
| 3,199,540 | A | * | 8/1965 | Forster | 137/625.69 |
| 3,354,911 | A | * | 11/1967 | Fall | 137/625.69 |
| 3,451,430 | A | * | 6/1969 | Cowdin | 137/625.69 |
| 3,565,115 | A | * | 2/1971 | Beckett et al. | 137/625.69 |
| 3,709,507 | A | * | 1/1973 | Underwood | 251/358 |
| 3,968,971 | A | * | 7/1976 | Mariaulle | 137/625.69 |
| 3,980,336 | A | * | 9/1976 | Bitonti | 137/625.69 |

(Continued)

FOREIGN PATENT DOCUMENTS

JP 50-92526 7/1975

(Continued)

OTHER PUBLICATIONS

An Office Action issued in the counterpart Taiwanese Patent Application.

(Continued)

*Primary Examiner*—John Rivell
(74) *Attorney, Agent, or Firm*—McCormick, Paulding & Huber LLP (57) ABSTRACT

A valve accommodating hole (11), and each of a supply port (20), discharge ports (21 and 22), and output ports (23 and 24) connected to the valve accommodating hole are formed in a valve casing (15), and a valve shaft (12) is attached to the valve accommodating hole (11) so as to be reciprocable in the axial direction. Circular rubber elastic valve elements (51 and 52) are attached to the valve shaft (12) and used for switching between a communication state where either one of the elastic valve elements is spaced away from an inner peripheral sealing surface of the valve accommodating hole (11) such that the supply port (20) and the respective output port (23 or 24) communicate with each other and a shut-off state where either one of the elastic valve elements comes in contact with the inner peripheral sealing surface such that the communication is shut off. Composite valve elements (61 and 62) each equipped with a circular reinforcement ring (63) and a rubber elastic seal (64) integrally provided to the reinforcement ring are attached to the valve casing (15), and each of the composite valve elements (61 and 62) switches between a communication state where the respective valve shaft output port (23 or 24) and the respective discharge port (21 or 22) communicate with each other and a shut-off state where the communication is shut off.

6 Claims, 5 Drawing Sheets

U.S. PATENT DOCUMENTS

| | | | | |
|---|---|---|---|---|
| 4,325,402 | A | * | 4/1982 | Akkerman et al. .... 137/625.69 |
| 4,371,178 | A | * | 2/1983 | Ott .............................. 251/361 |
| 4,491,155 | A | * | 1/1985 | Meyer et al. .......... 137/625.66 |
| 4,966,196 | A | * | 10/1990 | Meyer ................... 137/625.64 |
| 5,171,025 | A | * | 12/1992 | Stoll et al. ............. 137/625.66 |
| 5,338,005 | A | | 8/1994 | Stoll |

FOREIGN PATENT DOCUMENTS

| | | |
|---|---|---|
| JP | 56-12174 | 2/1981 |
| JP | 3-52474 | 5/1991 |
| JP | 2826460 | 8/1995 |

OTHER PUBLICATIONS

An English Translation of the Office Action issued in the counterpart Taiwanese Patent Application.
Supplemental European Search Report dated Sep. 17, 2007.
European Office Action dated Jan. 15, 2008.

* cited by examiner

DIRECTIONAL CONTROL VALVE

TECHNICAL FIELD

The present invention relates to a directional control valve for controlling the switching of the flow direction of fluid. More particularly, it relates to a directional control valve suitable for use in a pneumatic circuit for supplying high-pressure compressed air from an air pressure source to a pneumatically actuated device.

BACKGROUND ART

A directional control valve is a valve for switching between a state where fluid flows and a state where the flow is shut off, or for switching the flow direction of the fluid from one port to another port. For example, in a pneumatic circuit for supplying compressed air from an air pressure source to a pneumatically actuated device, a directional control valve is used for switching between a state where compressed air is supplied from the air pressure source to the pneumatically actuated device and a state where supply of compressed air to the pneumatically actuated device is stopped to discharge the compressed air returned from the pneumatically actuated device.

Such a directional control valve has a valve casing in which a valve shaft is accommodated so as to be reciprocable in the axial direction, and a supply port, an output port, and an air discharge port are formed in the valve casing so as to communicate with the valve accommodating hole in which the valve shaft is accommodated so as to be movable in the axial direction. The air supply port is connected to an air pressure source, the output port is connected to a pneumatically actuated device, and the air discharge port is open to the atmospheric air directly or via an air discharge channel. A directional control valve provided with each type of the above-described ports is called a 3-port valve, and a directional control valve provided with one air supply port, two output ports, and two air discharge ports is called a 5-port valve.

The driving methods of the valve shaft include a direct actuation method in which the valve shaft is directly driven by an electromagnet and an indirect actuation method in which the valve shaft is actuated by compressed air. The indirect actuation method includes an external pilot type in which compressed air is supplied to a pilot valve from outside and an internal pilot type in which compressed air is supplied to a pilot valve from inside of the directional control valve. Furthermore, the driving methods of the valve shaft include a mechanical method in which a valve shaft is driven by a cam or a link mechanism and a manual operation method in which a valve shaft is driven manually.

Directional control valves of an indirect actuation type include a single solenoid type in which the valve is driven by one solenoid and a double solenoid type in which the valve is driven by two solenoids. The single solenoid type is a type in which, when electricity supplied to a solenoid is stopped, the valve shaft is returned to the original position, wherein the returning force is applied to the valve shaft by a spring or an air pressure. On the other hand, the double solenoid type is a type in which, even when electricity supplied to a solenoid to which electricity has been supplied is stopped, the valve shaft keeps the position at the time when the electricity is supplied.

As an example of the directional control valve, as described in Japanese Patent Publication No. 2826460, the directional control valve of a spool type having a valve shaft to which a plurality of rubber elastic valve elements each comprising an O ring are attached is used, wherein when mutual communication between ports is to be shut off, the respective elastic valve element is brought into contact with the inner peripheral surface of the valve accommodating hole between the ports. Each of the elastic valve elements is attached to a circular groove formed in the valve shaft. As described in the publication, the type of a directional control valve in which elastic valve elements are attached to a valve shaft has an advantage that sealing performance can be enhanced with low cost in comparison with a metal seal structure in which a valve element made of metal is brought into contact with a valve accommodating hole with a slight gap. On the other hand, there is a limit on the pressure of compressed air for performing switching control of the flow.

That is, the type of a directional control valve in which elastic valve elements are attached to a valve shaft is generally used in a pneumatic circuit to which compressed air with a pressure of about 0.7 to 1 MPa is applied. However, it is found out that, when the directional control valve is used in a pneumatic circuit to which compressed air with a pressure higher than that is supplied, the valve life is shortened due to damage or deformation of the elastic valve elements. As a result of the investigation for the cause thereof, it is found out that, while deformation or damage does not occur in the elastic valve element for switching between a state where an air supply port and an output port are communicating and a state where the communication is shut off even when the directional control valve is used over a long period of time, the elastic valve element for switching between a state where the output port and the air discharge port are communicating and a state where the communication is shut off is deformed or damaged in a comparatively short period of time.

In such a circumstance, as a result of the observation for the switching state of the channel in the directional control valve used in a high-pressure pneumatic circuit of about 2 MPa, it is found out that, when the both ports are communicating, the elastic valve element for switching the state of the output port and the air discharge port between a communication state and a shut-off state is spaced away from the bottom surface of the groove formed in the valve shaft and elastically deformed and extended outwardly in the radial direction. This phenomenon is not found in the elastic valve element for switching the state of the air supply port and the output port between a communication state and a shut-off state. Such phenomenon occurs probably for the reason that, when the output port and the air discharge port are in a communication state, the elastic valve element comes to the position corresponding to the discharge port, therefore, the elastic valve element is blown out by the air which flows into the valve accommodating hole through the output port and then flows toward outside in the radial direction through the air discharge port. When the elastic valve element in a communication state is elastically deformed due to the blowing-out phenomenon such that the radius thereof is extended by the air flowing toward outside and the elastic valve element is moved to attain a communication shut-off state while the above-described state is maintained, an outer peripheral portion of the elastic valve element is sometimes pinched between the inner peripheral edge of the valve hole and the valve shaft. If the blowing-out phenomenon is repeated, the elastic valve element is damaged, thereby shortening the life of the directional control valve and deteriorating the durability thereof. In order to prevent the blowing-out phenomenon, an attempt that the material of the rubber of the elastic valve element is changed to that having an increased hardness is made. However, when the hardness is increased, attachment performance of the elastic valve element to the valve shaft is deteriorated.

An object of the present invention is to provide a directional control valve which can prevent the blowing-out phenomenon of a valve element for switching ports.

Another object of the present invention is to improve the durability of the valve element, thereby providing a directional control valve having a long product life.

Another object of the present invention is to prevent increase in size of a valve casing even when an attachment hole for attaching the valve casing to another member is provided in the valve casing, thereby providing a small size directional control valve.

DISCLOSURE OF THE INVENTION

A directional control valve of the present invention is a directional control valve for switching an output port between a state of communicating with a supply port and a state of communicating with a discharge port, and the directional control valve comprises: a valve casing in which a valve accommodating hole and the supply port and the discharge port which are shifted in an axial direction and communicating with the valve accommodating hole are formed, and the output port is formed between the supply port and the discharge port; a valve shaft inserted in the valve accommodating hole of the valve casing so as to be reciprocable in an axial direction; circular elastic valve elements attached to the valve shaft and used for switching between a communication state where the elastic valve element is spaced away from an inner peripheral sealing surface of the valve accommodating hole such that the supply port and the output port communicate with each other and a shut-off state where the elastic valve element comes in contact with the inner peripheral sealing surface such that the communication is shut off; and composite valve elements which are equipped with a circular reinforcement ring and an elastic seal integrally provided to the reinforcement ring, inserted in the valve casing, and used for switching between a communication state where the composite valve element is spaced away from a sealing surface of the valve shaft such that the output port and the discharge port communicate with each other and a shut-off state where the composite valve element comes in contact with the sealing surface such that the communication is shut off.

The directional control valve of the present invention is characterized in that the elastic valve element is moved to a position corresponding to the supply port in the communication state.

The directional control valve of the present invention is characterized in that the composite valve element is provided between the output port and the discharge port, and the composite valve element comes in contact with a chamfered portion formed in the valve shaft in the shut-off state.

The directional control valve of the present invention is characterized in that the composite valve element is provided between the output port and the discharge port, and the composite valve element comes in contact with an outer peripheral surface of the valve shaft in the shut-off state.

The directional control valve of the present invention is characterized in that the directional control valve is a 5-port valve in which two output ports of first and second output ports are formed at both sides of the supply port in the valve casing, and first and second discharge ports are formed adjacent to the respective output ports.

The directional control valve of the present invention is characterized in that attachment holes for attaching the valve casing to another member are positioned between the supply port and the discharge port and formed in the valve casing.

According to the present invention, the elastic valve element for switching the state of the supply port and the output port between the communication state and the shut-off state is attached to the valve shaft, meanwhile, the composite valve element equipped with the reinforcement ring and the elastic seal for switching the state of the output port and the discharge port between the communication state and the shut-off state is inserted in the valve casing. Therefore, the blowing-out phenomenon due to the fluid flow toward outside from the output port to the discharge port does not occur in the composite valve element, and the deformation or damage of the composite valve element is prevented, thereby improving the durability of the directional control valve.

According to the present invention, when the elastic valve element moves to a state where the supply port and the output port are communicating, the elastic valve element comes to the position corresponding to the supply port. Since pressure in a direction pressing it toward the valve shaft is applied to the elastic valve element by the fluid flow into the supply port from outside, the blowing-out phenomenon does not occur in the elastic valve element.

According to the present invention, the type of the composite valve element may be a poppet valve wherein the composite valve element comes into contact with the chamfered portion formed in the valve shaft in a state where it shuts off the discharge port, or may be a spool valve wherein it comes into contact with the outer peripheral surface of the valve shaft in the shut-off state. Furthermore, the directional control valve of the present invention can be applied to, for example, a 3-port valve and a 5-port valve as long as the valves have the supply port, the discharge port, and the output port formed in the valve casing.

According to the present invention, the attachment holes for attaching the valve casing to another member are formed at the position between the supply port and the discharge port, thereby providing a small directional control valve without increasing the width of the valve casing.

BEST MODE FOR CARRYING OUT THE INVENTION

Figure 1:
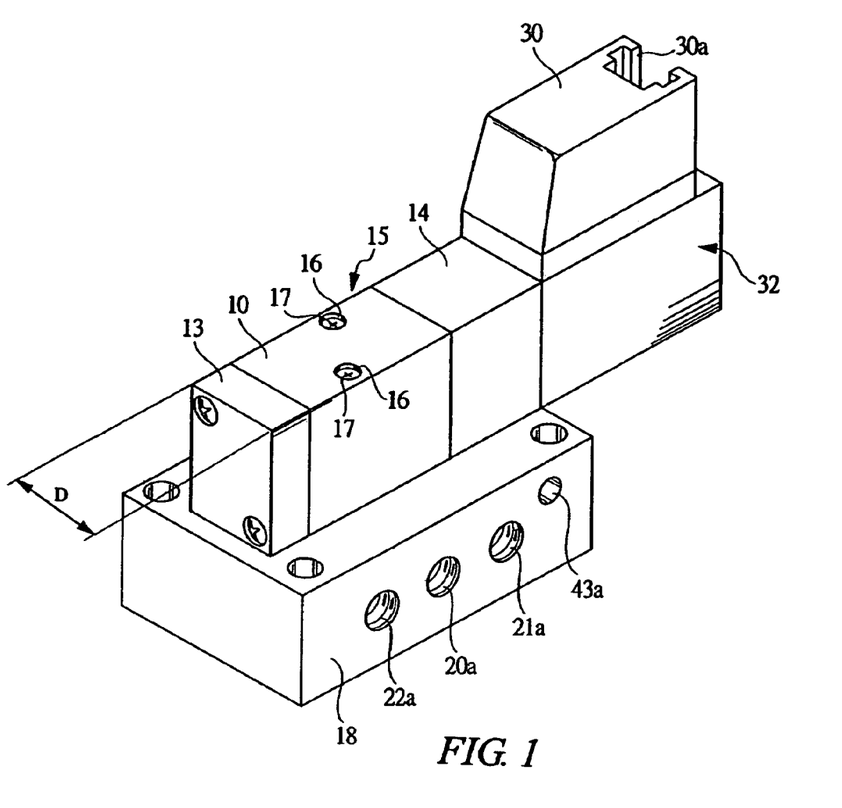
FIG. 1 is a perspective view showing a directional control valve according to an embodiment of the present invention.
Figure 2:
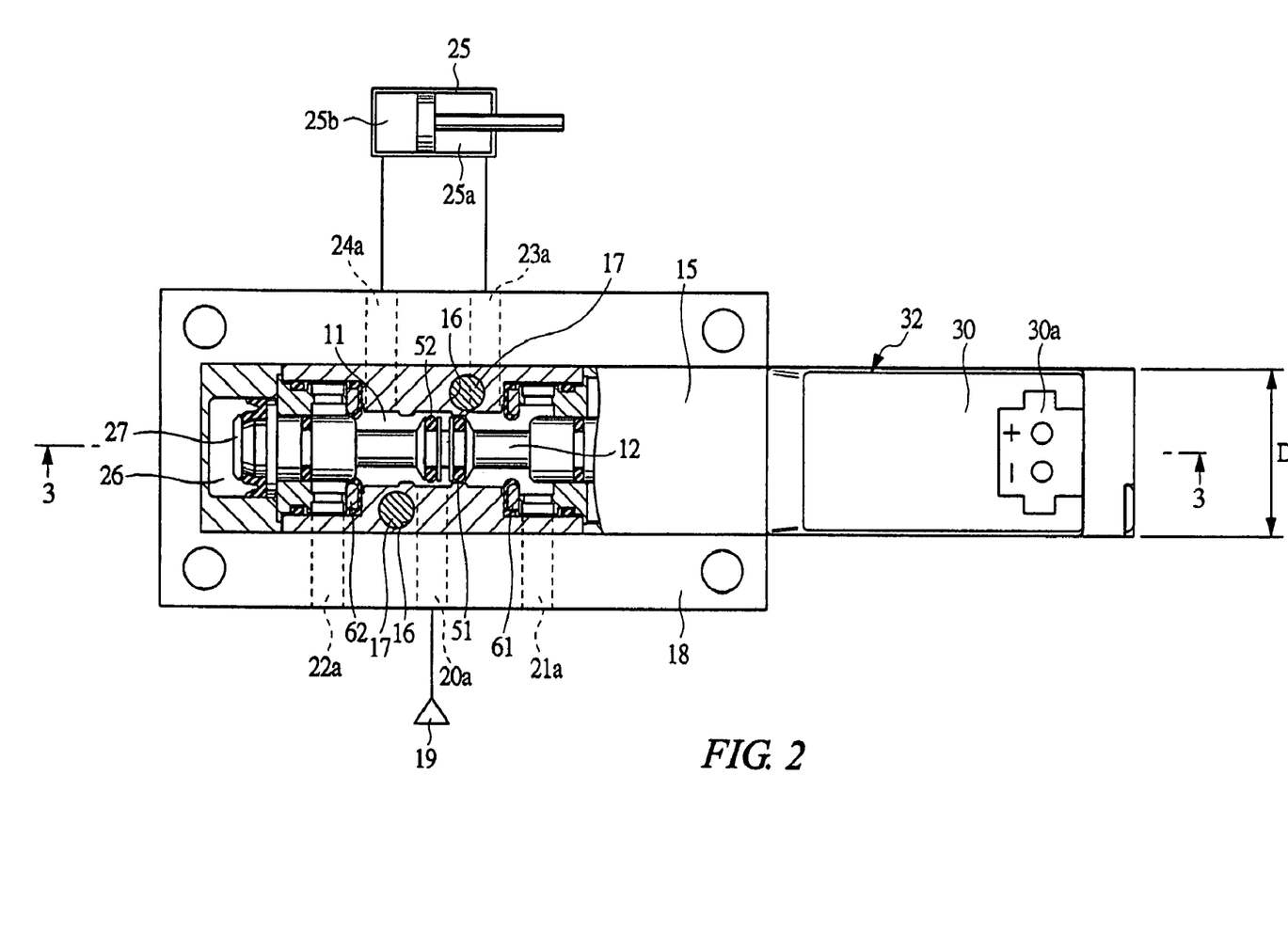
FIG. 2 is a partially cutaway plan view of FIG. 1 in a state where electricity is not supplied to a solenoid.
Figure 3:
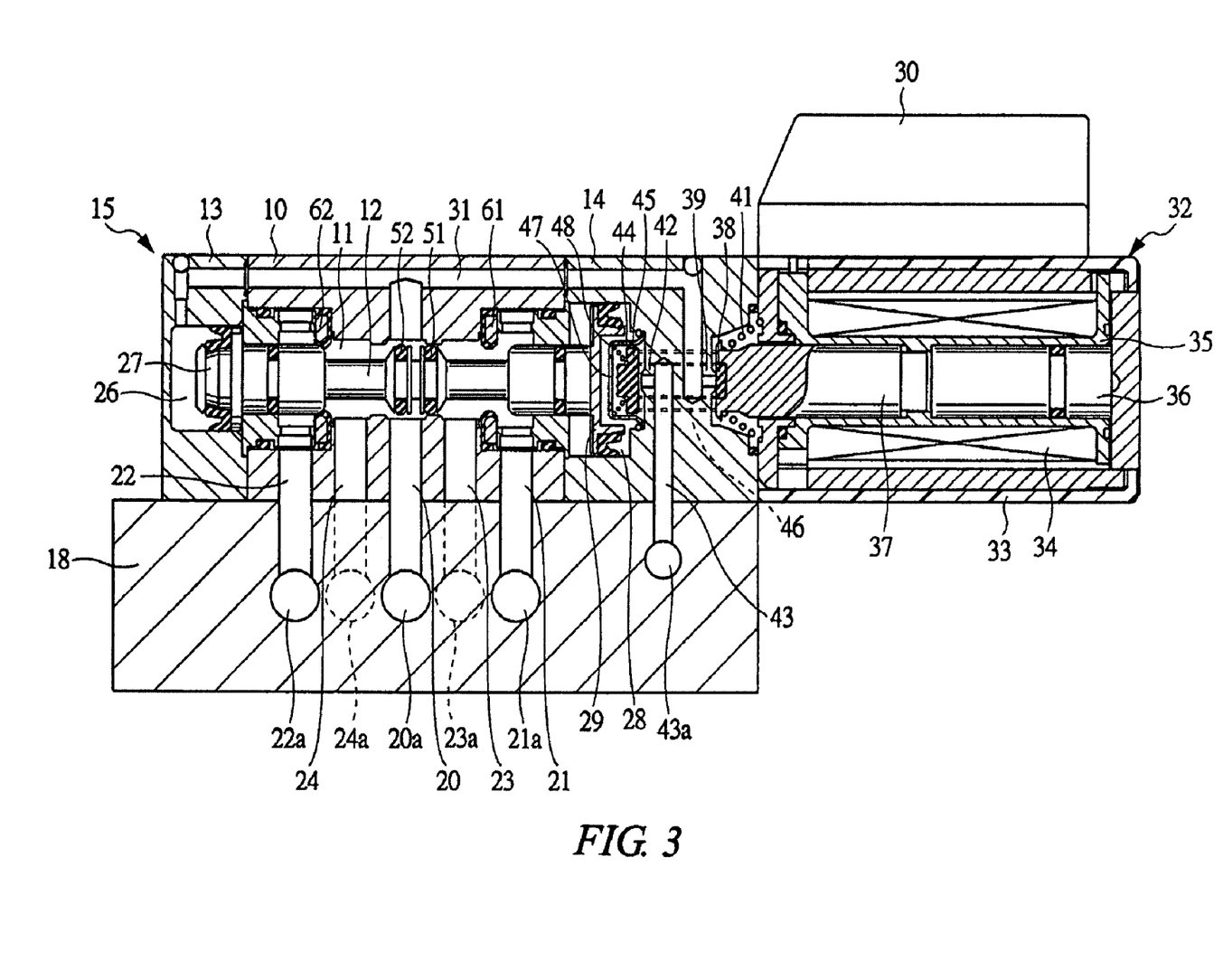
FIG. 3 is a cross-sectional view along the line A-A in FIG. 2.
Figure 4:
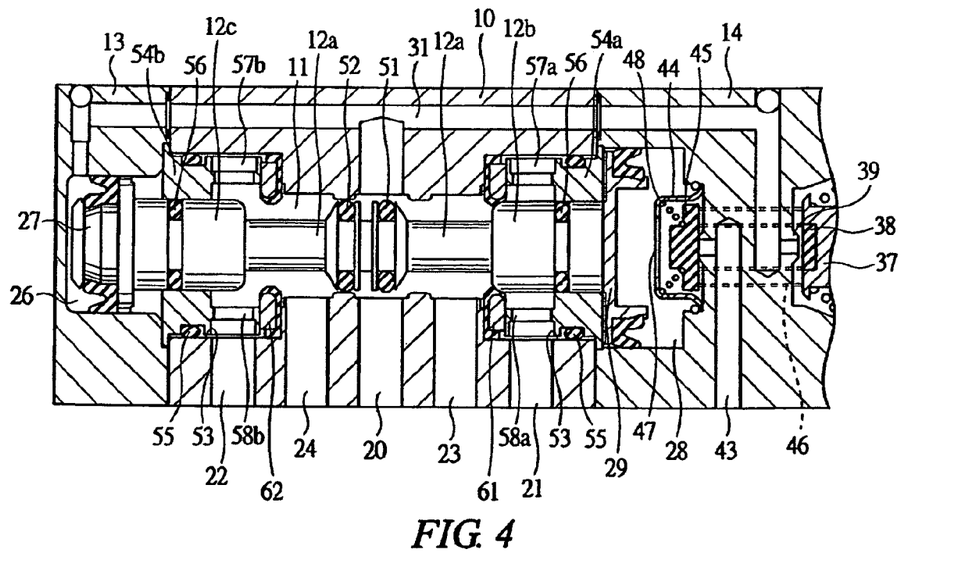
FIG. 4 is an enlarged cross-sectional view showing a portion of the directional control valve in a state where electricity is supplied to the solenoid.

Hereinafter, embodiments of the present invention will be described in detail based on drawings. This directional control valve has a main valve block 10 in an almost rectangular parallelepiped shape, and a valve shaft 12 is inserted in a valve accommodating hole 11 formed in the main valve block 10 along the longitudinal direction thereof so as to be reciprocable in the axial direction as shown in FIG. 3 and FIG. 4. A cover block 13 is fixed to one end of the main valve block 10, and a pilot block 14 is fixed to the other end thereof, wherein the main block 10, the cover block 13, and the pilot block 14 constitute a valve casing 15. As shown in FIG. 1 and FIG. 2, the directional control valve is attached to a supporting block 18 by screw members 17 inserted into attachment holes 16 formed in the main valve block 10, and the directional control valve is attached to a predetermined usage position by the supporting block 18.

As shown in FIG. 3 and FIG. 4, a supply port, i.e., an air supply port 20 communicating with the valve accommodating hole 11 is formed at the central portion of the main valve block 10 in the longitudinal direction, two air discharge ports 21 and 22 are formed on both sides of the air supply port 20 at the positions shifted in the axial direction, and output ports 23 and 24 are formed between the air supply port 20 and the respective air discharge ports 21 and 22. Each of the ports 20 to 24 is open on the bottom face of the main valve block 10 facing to the supporting block 18, the air supply port 20 communicates with an air supply hole 20a formed in the supporting block 18, and the air discharge ports 21 and 22 are communicating with air discharge holes 21a and 22a, respectively, formed in the supporting block 18. Each of the holes 20a to 22a is open on one end face of the supporting block 18, and output holes 23a and 24a formed so as to be open on the other end face are communicating with the output ports 23 and 24, respectively.

When the directional control valve is used in a pneumatic circuit for supplying compressed air from an air pressure source to an air cylinder 25 as a pneumatically actuated device as shown in FIG. 2, an air pressure source 19 is connected to the air supply hole 20a by means of piping, one of the output holes 23a is connected to one air pressure chamber 25a of the air cylinder 25 by means of piping, and the other output hole 24a is connected to the other air pressure chamber 25b by means of piping.

A small diameter piston 27 is built in a compression chamber 26 formed in the cover block 13, and a piston 29 with a diameter larger than the piston 27 is built in a compression chamber 28 formed in the pilot block 14 so as to have a diameter larger than the compression chamber 26. The pistons 27 and 29 are disposed at both ends of the valve shaft 12, respectively, and each of the pistons 27 and 29 may be integral with the valve shaft 12 or the pistons 27 and 29 may be separated from the valve shaft 12. The compression chamber 26 communicates with the air supply port 20 via an air supply channel 31 which is formed in the valve casing 15, and when compressed air is supplied to the air supply port 20 via the air supply hole 20a, a thrust force in the rightward direction in FIG. 2 to FIG. 4 is applied to the valve shaft 12. Meanwhile, when the compression chamber 28 communicates with the air supply channel 31 and compressed air is supplied to the compression chamber 28, a thrust force in the leftward direction is applied to the valve shaft 12. When compressed air is supplied to both of the compression chambers 26 and 28, since the thrust force applied from the large diameter piston 29 to the valve shaft 12 is larger than the thrust force applied from the small diameter piston 27 to the valve shaft 12 in the opposite direction, the valve shaft 12 is driven to the left side in the drawing, and the valve shaft 12 takes a first position as shown in FIG. 4. Meanwhile, when supply of compressed air to the compression chamber 28 is stopped, the valve shaft 12 is driven to the right side by virtue of the thrust force applied from the small diameter piston 27 to the valve shaft 12 as shown in FIG. 2 and FIG. 3, and the valve shaft 12 takes a second position.

A pilot valve 32 is attached to the valve casing 15 for switching between a state where the compression chamber 28 communicates with the air supply channel 31 so as to supply compressed air to the compression chamber 28 and a state where the air in the compression chamber 28 is discharged to outside. As shown in FIG. 3, a solenoid portion 33 of the pilot valve 32 has a bobbin 35 on which a coil 34 is wound, and a fixed iron core 36 is attached and a plunger, i.e., a movable iron core 37 is loaded so as to be reciprocable in the axial direction in the bobbin 35. In order to supply electric power to the coil 34, a connector portion 30a to which electrically conductive cable terminals (not shown) are connected is provided in a control case 30 attached to the solenoid portion 33.

As shown in FIG. 3, a rubber opening and closing valve 38 is attached to the tip of the movable iron core 37 such that the opening and closing valve 38 comes into contact with a first valve seat 39 formed in the pilot block 14. An opening of the air supply channel 31 is formed in the valve seat 39, and the opening is opened and closed by the opening and closing valve 38. A helical compression spring 41 for applying a spring force to the opening and closing valve 38 toward the valve seat 39 is attached to the movable iron core 37. Therefore, when electricity is supplied to the coil 34, the movable iron core 37 is moved toward the fixed iron core 36 against the spring force, the opening of the air supply channel 31 is opened. When the electricity is stopped, the opening of the air supply channel 31 is closed by virtue of the spring force.

A second valve seat 42 directed toward the direction opposite to the valve seat 39 is formed on the side opposite to the valve seat 39, wherein an opening of an air discharge channel 43 communicating with the outside of the pilot block 14 is provided in the valve seat 42, and the air discharge channel 43 communicates with an air discharge hole 43a formed in the supporting block 18. A valve holder 44 in a cylindrical shape is attached to the pilot block 14 so as to cover the valve seat 42, a flapper valve 45 is built in the valve holder 44 such that it can be opened and closed, and the flapper valve 45 opens and closes the opening of the air discharge channel 43. A plurality of interlock pins 46 are disposed between the flapper valve 45 and the movable iron core 37 through interlock pin holes, and the flapper valve 45 is actuated so as to be opened or closed by the movable iron core 37 through the intermediary of the interlock pins 46.

A through hole 47 is formed in the valve holder 44, and when electricity supplied to the coil 34 is stopped, the movable iron core 37 is pressed against the valve seat 39 by virtue of the spring force. Therefore, the opening and closing valve 38 comes into contact with the valve seat 39 and the flapper valve 45 is spaced away from the valve seat 42. As a result, the compression chamber 28 comes in a state where it is communicating with outside via the air discharge channel 43, and the air in the compression chamber 28 is discharged to outside via the through hole 47. Meanwhile, when electricity is supplied to the coil 34, the opening and closing valve 38 is spaced away from the valve seat 39 while the flapper valve 45 comes into contact with the valve seat 42, and the flapper valve 45 is pressed against the valve seat 42 by a coiled spring 48 built in the valve holder 44. Therefore, the air discharge channel 43 is closed, and the compressed air supplied from the air supply port 20 via the air supply channel 31 flows into the compression chamber 28 via the gaps between the interlock pins 46 and the holes through which the pins are inserted. As described above, when compressed air is supplied into the compression chamber 28, the valve shaft 12 takes the first position shown in FIG. 4, and when the compressed air in the compression chamber 28 is discharged, the valve shaft 12 takes the second position shown in FIG. 3.

Each of circular elastic valve elements 51 and 52 is attached in a circular groove formed in the valve shaft 12 at the positions mutually shifted in the axial direction. When the valve shaft 12 takes the second position shown in FIG. 3, one of the elastic valve elements 51 comes into contact with an inner peripheral sealing surface formed by the inner surface of the valve accommodating hole 11 between the air supply port 20 and the output port 23 so as to shut off the communication between the ports 20 and 23. Meanwhile, when the valve shaft 12 takes the first position shown in FIG. 4, the elastic valve element 51 is spaced away from the inner peripheral sealing surface and comes to a position corresponding to the air supply port 20 so as to allow the compressed air flowing from the air supply port 20 to communicate with the output port 23.

When the valve shaft 12 takes the first position shown in FIG. 4, the other elastic valve element 52 comes into contact with an inner peripheral sealing surface formed by the inner surface of the valve accommodating hole 11 between the air supply port 20 and the output port 24 so as to shut off the communication between the ports 20 and 24. Meanwhile, when the valve shaft 12 takes the second position shown in FIG. 3, the elastic valve element 52 is spaced away from the inner peripheral sealing surface and comes to a position corresponding to the air supply port 20 so as to allow the compressed air flowing from the air supply port 20 to communicate with the output port 24. A rubber O ring with a slightly elliptic cross section is used as each of the elastic valve elements 51 and 52, and each of them has a spool valve configuration for shutting off the communication between the ports when it comes into contact with the inner peripheral surface of the valve accommodating hole 11.

As shown in FIG. 4, when electricity is supplied to the coil 34 of the solenoid portion 33 and the valve shaft 12 takes the first position, compressed air is supplied to the air pressure chamber 25a of the air cylinder 25 shown in FIG. 2 through the output port 23, and the compressed air in the air pressure chamber 25b flows into the output port 24 and then is released to outside through the air discharge port 22. When electricity supplied to the coil 34 is stopped, the valve shaft 12 moves to the second position such that compressed air is supplied to the air pressure chamber 25b in the air cylinder 25 shown in FIG. 2 through the output port 24 and the compressed air in the air pressure chamber 25a flows into the output port 23 and then is discharged to outside through the air discharge port 21.

As shown in FIG. 4, the portions of the valve shaft 12 at both sides of the elastic valve elements 51 and 52 are small-diameter portions 12a, and both ends of the valve shaft 12 are large-diameter portions 12b and 12c having a diameter larger than that of the small-diameter portions 12a. Large diameter holes 53 are formed at the positions corresponding to the respective large diameter portion 12b or 12c of the valve shaft 12 in the main valve block 10. Each of spacers 54a and 54b is fitted in the respective large-diameter hole 53, and the space between the outer peripheral surface of the spacers 54a and 54b and the main valve block 10 is sealed by sealing members 55. Sealing members 56 for sealing the space between the valve shaft 12 and the spacers 54a and 54b are attached to the large-diameter portions 12b and 12c of the valve shaft 12 so as to slidably come into contact with the inner peripheral surfaces of the spacers 54a and 54b along with the movement of the valve shaft 12 in all axial directions. Circular grooves 57a and 57b are formed at the positions corresponding to the air discharge ports 21 and 22 in the spacers 54a and 54b, respectively, and a plurality of communication holes 58a and 58b in the radial direction are formed in the spacers 54a and 54b, respectively, so as to allow the circular grooves 57a and 57b to communicate with the inner peripheral surfaces of the spacers 54a and 54b, respectively.

A composite valve element 61 positioned between the output port 23 and the air discharge port 21 is attached to the main valve block 10, and the composite valve element 61 is clamped between a stepped portion formed in the main valve block 10 and the spacer 54a. When the valve shaft 12 takes the first position shown in FIG. 4, the composite valve element 61 comes into contact with a sealing surface of the valve shaft 12 so as to shut off the communication between the output port 23 and the air discharge port 21. Meanwhile, when the valve shaft 12 takes the second position shown in FIG. 3, the composite valve element 61 is spaced away from the sealing surface of the valve shaft 12 so as to allow the output port 23 to communicate with the air discharge port 21.

A composite valve element 62 positioned between the output port 24 and the air discharge port 22 is attached to the main valve block 10, and the composite valve element 62 is clamped between a stepped portion formed in the main valve block 10 and the spacer 54b. When the valve shaft 12 takes the first position shown in FIG. 4, the composite valve element 62 is spaced away from the sealing surface of the valve shaft 12 so as to allow the output port 24 and the air discharge port 22 to communicate. Meanwhile, when the valve shaft 12 takes the second position shown in FIG. 3, the composite valve element 62 comes into contact with the sealing surface of the valve shaft 12 so as to shut off the communication between the output port 24 and the air discharge port 22.

Figure 5:
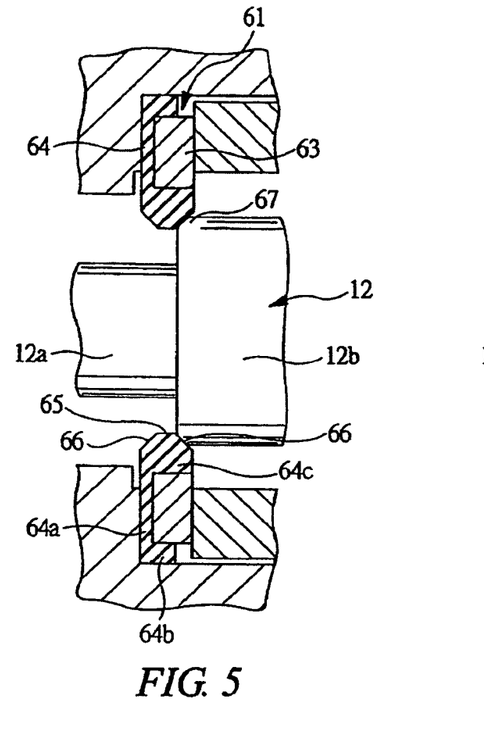
FIG. 5 is an enlarged cross-sectional view showing a portion of FIG. 4.

FIG. 5 is an enlarged cross-sectional view showing the composite valve element 61. The composite valve element 61 comprises a reinforcement ring 63 made of metal and a rubber elastic seal 64 which is integrally provided to the reinforcement ring 63 so as to extend from the outer peripheral surface to the inner peripheral surface via one end face of the reinforcement ring 63. The elastic seal 64 has a radial portion 64a integrally provided to the end face of the reinforcement ring 63, an outer peripheral portion 64b covering the portion of the outer periphery of the reinforcement ring 63, and an inner peripheral sealing portion 64c covering the inner peripheral portion of the reinforcement ring 63, wherein the elastic seal is vulcanized and bonded to the reinforcement ring 63. The other composite valve element 62 also comprises a reinforcement ring 63 and an elastic seal 64 in the same manner, and the configuration thereof is the same as that of the composite valve element 61. The material of the reinforcement ring 63 is not limited to metals but may be a hard resin as long as the material has a certain rigidity that the ring is not elastically deformed even when the pressure of compressed air flow is acted thereon.

As shown in FIG. 5, the inner peripheral sealing portion 64c of the elastic seal 64 has an axial-direction surface 65 at the center and taper surfaces 66 on both sides thereof, and one of the taper surfaces 66 comes into contact with the valve shaft 12 wherein a chamfered arc surface 67 of the large diameter portion provided in the valve shaft 12 serves as a sealing surface. Therefore, since the composite valve element 61 is elastically deformed in the axial direction when it comes into contact with the valve shaft 12, the type of the composite valve elements 61 and 62 shown in FIG. 5 is a poppet valve type.

Figure 6:
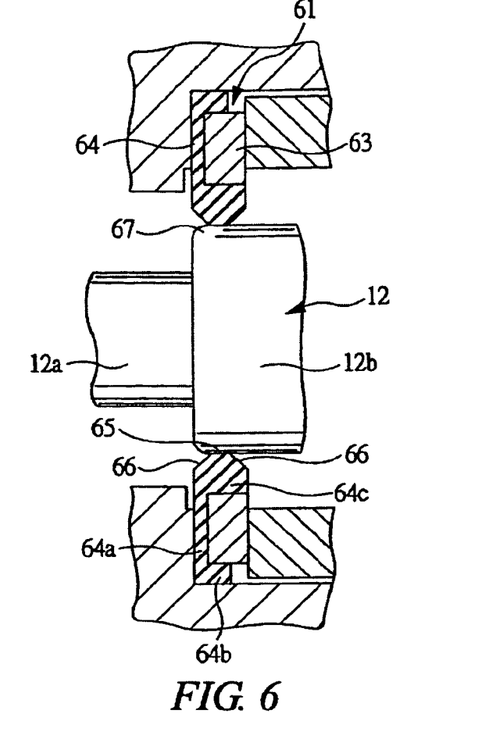
FIG. 6 is a cross-sectional view showing a portion of a directional control valve corresponding to that of FIG. 5 according to another embodiment of the present invention.

FIG. 6 is a cross-sectional view showing a portion of a directional control valve corresponding to that of FIG. 5 according to another embodiment of the present invention, and the composite valve elements 61 and 62 of the directional control valve shown in FIG. 6 have the same configuration as that in the case shown in FIG. 5. In this case, each of the composite valve elements 61 and 62 comes into contact with the outer peripheral surface of the valve shaft 12 by the axial-direction surface 65 of the inner-peripheral sealing portion 64c thereof. Therefore, along with the movement of the valve shaft 12 in the axial direction, the composite valve elements 61 and 62 come into contact with the valve shaft 12 by the outer peripheral surface of the large diameter portion of the valve shaft 12 serving as a sealing surface. At this time, the composite valve element is elastically deformed in the radial direction and comes into contact with the valve shaft 12. Therefore, the type thereof is a spool valve type. As described above, the contact between the composite valve elements 61 and 62 and the sealing surface of the valve shaft 12 may be either a poppet valve type or a spool valve type.

Each of FIGS. 7A to 7E is a cross-sectional view showing a modification example of the composite valve elements 61 and 62. The elastic seal 64 of the composite valve element 61 or 62 shown in FIG. 7A has the outer peripheral portion 64b which covers a portion of the outer periphery of the reinforcement ring 63 and the inner peripheral sealing portion 64c which covers the inner periphery, and the radial portion 64a shown in FIG. 5 is not provided. Therefore, the reinforcement rings 63 of the composite valve elements 61 and 62 are clamped between the stepped portion of the valve casing 15 and the spacers 54a and 54b, respectively. The shape of the inner peripheral sealing portion 64c is the same as that in the case shown in FIG. 5.

Figure 7A:
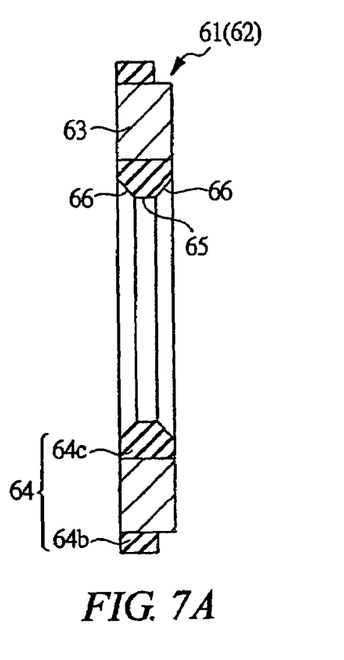
FIGS. 7A to 7E are cross-sectional views each showing a modification example of a composite valve element.
Figure 7B:
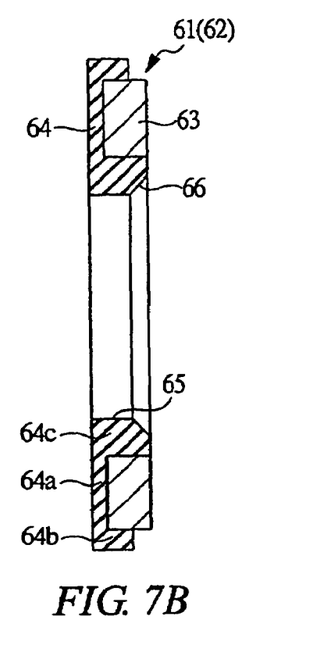

In the composite valve element 61 or 62 shown in FIG. 7B, the shape of the cross section of the inner peripheral sealing portion 64c of the elastic seal 64 is different from that of the case shown in FIG. 5, wherein the taper surface 66 is provided only on one side and the width of the axial-direction surface 65 is larger than that shown in FIG. 5.

Figure 7C:
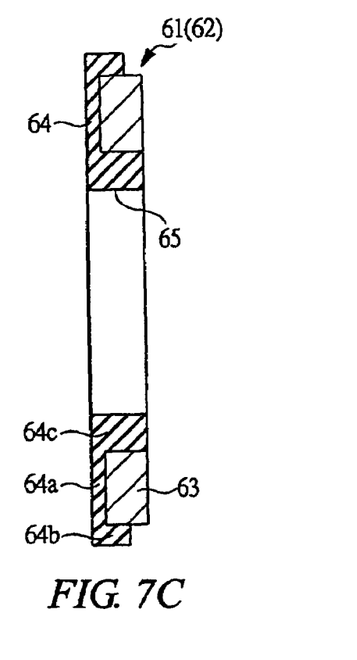

In the composite valve element 61 or 62 shown in FIG. 7C, the entirety of the inner peripheral surface of the inner peripheral sealing portion 64c of the elastic seal 64 serves as the axial-direction surface 65.

Figure 7D:
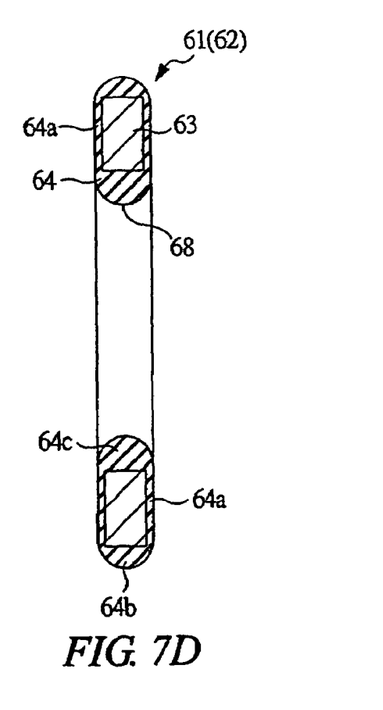

In the composite valve element 61 or 62 shown in FIG. 7D, the entirety of the outer surface of the reinforcement ring 63 is covered with the elastic seal 64, and both the outer peripheral portion 64b and the inner peripheral sealing portion 64c have circular arc surfaces. A circular arc surface 68 formed on the inner peripheral sealing portion 64c seals and comes into contact with the outer peripheral surface of the valve shaft 12.

Figure 7E:
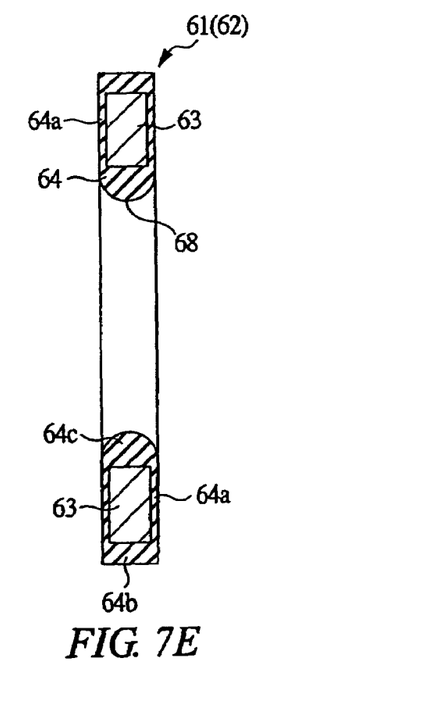

The composite valve element 61 or 62 shown in FIG. 7E is a modification example of that in FIG. 7D, and the outer peripheral portion of the elastic seal 64 is different from that shown in FIG. 7D, that is, the outer peripheral surface is flat. Also in the examples having the axial-direction surface 65 and the taper surface 66 shown in FIG. 7A to FIG. 7C, it is preferable to cover the entirety of the reinforcement ring 63 with the elastic seal 64.

Figure 8:
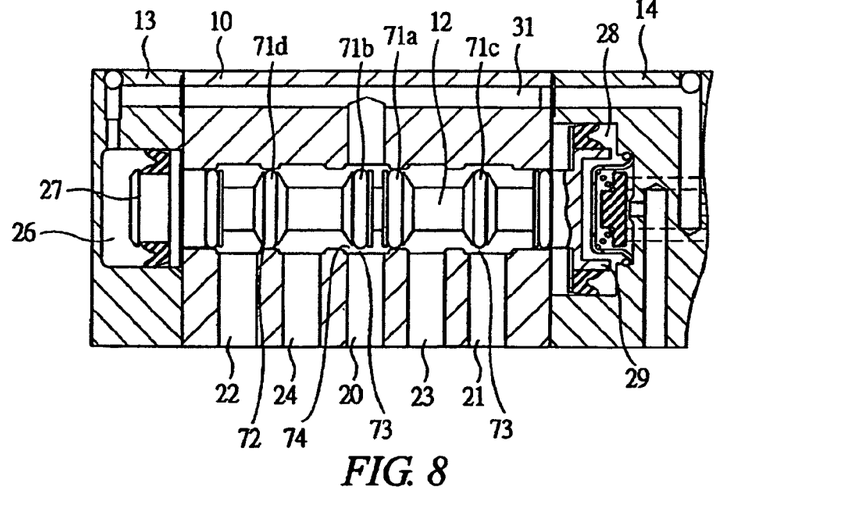
FIG. 8 is a cross-sectional view showing a portion of a directional control valve of a comparative example.

FIG. 8 is a cross-sectional view showing a conventional directional control valve as a comparative example, and the same components as those described above are denoted by the same reference numerals in FIG. 8. In the directional control valve of FIG. 8, elastic valve elements 71a to 71d each comprising an O ring are attached to the valve shaft 12 in order to mutually switch the state of respective ports between a communication state and a communication shut-off state. In the case where the directional control valve in which the elastic valve elements 71a to 71d are attached to the valve shaft 12 as described above is used in a high-pressure pneumatic circuit of, for example, about 2 MPa, when the both ports are communicating, the elastic valve element 71c or 71d for switching the state of the output port 23 or 24 and the air discharge port 21 or 22 between a communication state and a shut-off state is sometimes spaced away from the bottom surface of the groove and elastically deformed and extended outwardly in the radial direction. As a result, as denoted by a reference numeral 72 in FIG. 8, a portion of the elastic valve element 71c or 71d is sometimes pinched between the valve shaft 12 and the valve accommodating hole when moving the valve shaft 12. This phenomenon is not found in the elastic valve elements 71a and 71b each switching the state of the air supply port 20 and the output port 23 or 24 between a communication state and a shut-off state.

The blowing-out phenomenon in which the elastic valve element 71c or 71d is radially extended occurs when the respective output port 23 or 24 and the respective air discharge port 21 or 22 are in a communication state. This is because the elastic valve element 71c or 71d is at the position corresponding to the respective air discharge port 21 or 22 in a communication state and the elastic valve element 71c or 71d is blown out by the flow directed to the air discharge port 21 or 22 in the direction toward outside. Particularly, the gap 73 between the outer peripheral surface of the elastic valve element 71c or 71d and the valve accommodating hole 11 is narrowed in a communication state, and the flow rate at the portion becomes the fastest. On the other hand, the flow rate at the outer peripheral surface of the elastic valve element 71a or 71b does not become the fastest because the flow directed from outside to inside is applied to the elastic valve element 71a or 71b for switching the state of the air supply port 20 and the output port 23 or 24 between a communication state and a shut-off state, and the gap 74 between the valve shaft 12 and the valve accommodating hole 11 is narrower than the gap between the outer peripheral surface of the elastic valve element 71a or 71b and the valve accommodating hole 11.

For this reason, when the air pressure is increased, the blowing-out phenomenon sometimes occurs in the elastic valve element 71c or 71d shown in FIG. 8. However, in the directional control valve of the present invention, each of the composite valve elements 61 and 62 for switching the state of the output port 23 or 24 and the air discharge port 21 or 22 between a communication state and a shut-off state is formed of the reinforcement ring 63 and the elastic seal 64, and is attached to the valve casing 15. Therefore, even when it is used in a high-pressure pneumatic circuit of 2 MPa or more, the blowing-out phenomenon does not occur unlike a conventional case in FIG. 8. In the present invention, when the composite valve elements 61 and 62 are inserted in the valve casing 15, the force caused by the air flow directed in the axial direction and outwardly in the radial direction is applied to the composite valve element 61 or 62 when the air discharge port 21 or 22 is opened. Therefore, the force for blowing out the composite valve element 61 or 62 is not applied thereto. Furthermore, since the reinforcement ring 63 is built in each of the composite valve elements 61 and 62, deformation of the elastic seal 64 can be prevented even when the force directed in the axial direction and outwardly in the radial direction is applied. Therefore, durability of the directional control valve is improved, and the life of the valve can be extended.

When the ports are communicating, external force is applied to the elastic valve element 51 or 52 from outside to inside in the radial direction. Therefore, even when the elastic valve elements 51 and 52 are attached to the valve shaft 12, occurrence of the blowing-out phenomenon in the elastic valve element 51 or 52 is prevented by virtue of the flowing air. Furthermore, by attaching the elastic valve elements 51 and 52 to the valve shaft 12, the inner diameter of the valve accommodating hole 11 corresponding to the air supply port 20 and the output ports 23 and 24 adjacent to the air supply port 20 can be set in the same manner as the case shown in FIG. 8, and the inner diameter of a center portion of the valve accommodating hole 11 in the axial direction can be reduced so as to be smaller than the inner diameter of the portions at the both ends thereof. Therefore, as shown in FIG. 1 and FIG. 2, since each of the attachment holes 16 is formed between the air supply port 20 and the output ports 23 and 24, the width D of the valve casing 15 is not increased and can be set in the same manner as the case shown in FIG. 8. Accordingly, downsizing of the directional control valve can be maintained.

The present invention is not limited to the above-described embodiments, and various modifications can be made within the scope of the invention. For example, the present invention can be applied to a 3-port valve or the like as long as the directional control valve has an air supply port, an output port, and an air discharge port. The driving method of the valve shaft 12 is not limited to an indirect actuation type utilizing a pilot pressure controlled by the pilot valve 32, and the present invention can be also applied to a direct actuation method in which the valve shaft 12 is directly driven by a solenoid, a mechanical method in which a valve shaft is driven by a cam or a link mechanism, and a manual operation method in which a valve shaft is driven manually. Furthermore, although the directional control valve shown in the drawings is a single solenoid type, the present invention can be applied to that of a double solenoid type.

In the case shown in FIG. 1, the output holes 23a and 24a communicating with the output ports 23 and 24 of the directional control valve are formed in the supporting block 18, and a coupling is attached to each of the output holes 23a and 24a so as to supply air to a pneumatically actuated device such as the air cylinder 25. However, the couplings may be attached to the upper surface of the main valve block 10 so as to communicate with the respective output ports 23 and 24. Furthermore, one directional control valve is mounted on the supporting block 18. However, it is also possible to mount a plurality of directional control valves on a manifold block in which shared air supply holes and air discharge holes are respectively formed such that air is supplied and discharged to or from the plurality of directional control valves through the shared air supply holes and air discharge holes.

The directional control valve of the present invention is used not only for switching the flow direction of air, but also for switching the flow direction of an inert gas or a liquid.

INDUSTRIAL APPLICABILITY

The directional control valve of the present invention can be used for switching the flow direction of fluid such as air in a fluid pressure circuit for supplying fluid from a fluid pressure source to a fluid pressure actuated device.

The invention claimed is:

1. A directional control valve for switching an output port between a state of communicating with a supply port and a state of communicating with a discharge port, the directional control valve comprising:

a valve casing in which a valve accommodating hole and said supply port and said discharge port which are shifted in an axial direction and communicating with the valve accommodating hole are formed, and said output port is formed between said supply port and said discharge port;

a valve shaft inserted in said valve accommodating hole of said valve casing so as to be reciprocable in an axial direction;

a circular elastic valve element attached to said valve shaft and used for switching between a communication state where the elastic valve element is spaced away from an inner peripheral sealing surface of said valve accommodating hole such that said supply port and said output port communicate with each other and a shut-off state where the elastic valve element comes in contact with said inner peripheral sealing surface and the communication is shut off; and a composite valve element which is equipped with a circular reinforcement ring and an elastic seal integrally provided to the reinforcement ring, attached to the valve casing, and used for switching between a communication state where the composite valve element is spaced away from a sealing surface of said valve shaft such that said output port and said discharge port communicate with each other and a shut-off state where the composite valve element comes in contact with the sealing surface such that the communication is shut off.

2. The directional control valve according to claim 1 characterized in that said elastic valve element is moved to a position corresponding to said supply port in said communication state.

3. The directional control valve according to claim 1 characterized in that said composite valve element is provided between said output port and said discharge port, and said composite valve element comes in contact with a chamfered portion formed in said valve shaft in said shut-off state.

4. The directional control valve according to claim 1 characterized in that said composite valve element is provided between said output port and said discharge port, and said composite valve element comes in contact with an outer peripheral surface of said valve shaft in said shut-off state.

5. The directional control valve according to claim 1 characterized in that said directional control valve is a 5-port valve in which two output ports of first and second output ports are formed at both sides of said supply port in said valve casing, and first and second discharge ports are formed adjacent to said respective output ports.

6. The directional control valve described in claim 1 characterized in that an attachment hole for attaching said valve casing to another member is positioned between said supply port and said discharge port and formed in said valve casing.

* * * * *